(No Model.)

A. McCONNELL.
ROCK DRILL.

No. 326,511. Patented Sept. 15, 1885.

WITNESSES:
Donn Twitchell
C. Sedgwick

INVENTOR:
A. McConnell
BY Munn & Co.
ATTORNEYS.

UNITED STATES PATENT OFFICE.

ANDREW McCONNELL, OF PITTSBURG, PENNSYLVANIA, ASSIGNOR OF ONE-HALF TO EDWARD W. SWENTZEL, OF SAME PLACE.

ROCK-DRILL.

SPECIFICATION forming part of Letters Patent No. 326,511, dated September 15, 1885.

Application filed October 23, 1884. Renewed August 5, 1885. (No model.)

*To all whom it may concern:*

Be it known that I, ANDREW McCONNELL, of Pittsburg, in the county of Allegheny and State of Pennsylvania, have invented a new and Improved Rock-Drill, of which the following is a full, clear, and exact description.

My invention consists in an improved construction of rock-drill which is adapted to be operated by hand, especially for the use of prospectors; or it may be operated by power for any of the purposes for which drills are generally used.

The special feature of the invention consists in a mechanical movement by which the reciprocation of the drill-rod is accomplished in a very simple manner, as will be hereinafter described and claimed.

Reference is to be had to the accompanying drawings, forming a part of this specification, in which similar letters of reference indicate corresponding parts in both the figures.

Figure 1:
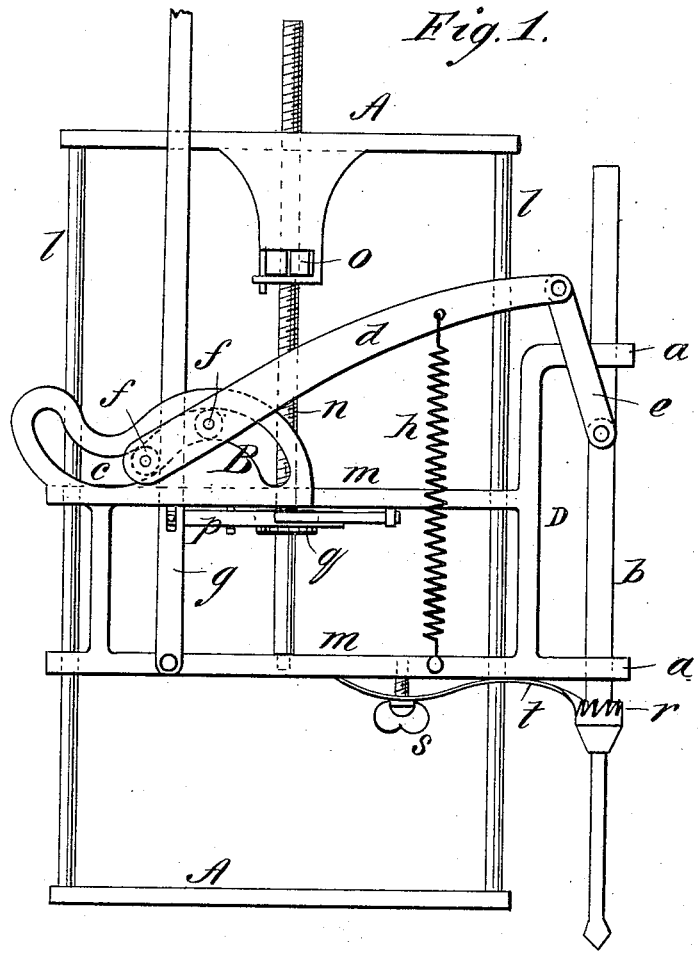
Figure 2:
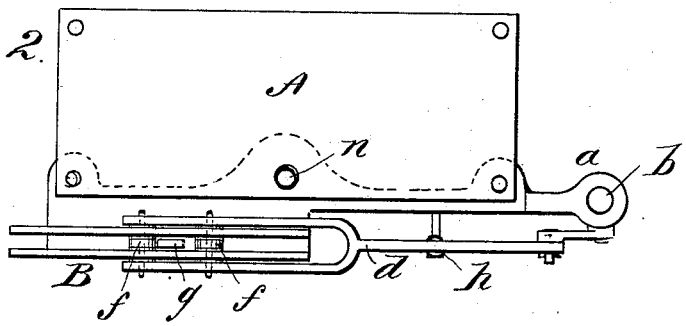

Figure 1 is a side elevation of a drill of my improved construction. Fig. 2 is a plan view of the same.

Upon guide-bars $l$ of a suitable stand, A, are cross-bars $m$, which are connected to form a frame, D, having guides $a\ a$, which carry the drill-rod $b$.

Upon the frame D is fixed a block, B, that is formed with a cam-slot, $c$, that is of reversely-curved or S form.

$d$ is a bar connected by a jointed link, $e$, at its end to the drill-rod, $b$, and forked at its inner end, so as to pass at the opposite sides of the block.

B and $ff$ are rollers journaled in the forked end of the bar $d$ and extending through the slot $c$.

$g$ is a lever hung at the lower end of the frame D, and extending vertically through a slot formed in the block B, and also between the two rollers $ff$ of the bar $d$.

$h$ is a spring connected to the outer end of the bar $d$ and to the frame D.

Each roller $f$ is in three portions, so that the lever $g$ bears on the middle portion, while the outer portions move on the side of slot $c$.

The lever $g$ is to be vibrated by hand or by connections to power in any suitable manner, and in its movement back and forth it comes in contact with the rollers $f$, thereby causing the movement of said rollers in the slot $c$ and of bar $d$. Starting from the position shown in Fig. 1, the lever being drawn back, the rollers follow the slot, and, by the shape of the cam-groove, the outer end of the bar $d$ is raised and with it the drill-rod $b$. As soon as the rollers reach the nearly-straight middle portion of the slot the drill-rod is at its highest point, and the position is such that the spring $h$ causes the sudden end movement of the bar $d$, and thus brings the drill-rod $d$ downward with a blow. Upon the return movement of the lever the same operation takes place, the springs acting as soon as the forward roller reaches the crown of the cam-slot. By shifting the spring $h$ to or from the outer end of bar $d$ the blow is made more or less soft.

For feeding the drill downward as the work progresses, a screw, $n$, is stepped in the cross-bar $m$ of frame D, and extends upward through a nut, $o$, at the upper part of stand A. A pawl-arm, $p$, from lever $g$, extends into engagement with a ratchet-wheel, $q$, on the screw, so that at each back and forth movement of lever $g$ the screw is partially turned, and the stand D thus worked gradually down on the guides $l$ of the stand. The chuck on the drill-rod is formed with a ratchet, $r$, and to stand D is attached a spring-pawl, $t$, having its end engaging ratchet $r$, bent so that as the ratchet comes up to the pawl by the raising of the drill-rod the pawl moves the ratchet and tool around. The spring-pawl is adjustable by a screw, $s$, to vary the extent of movement.

This mechanism is of comparatively inexpensive and simple construction, and the whole apparatus can be made of small size for hand use, or of larger size and of a more substantial character for drilling rocks.

Having thus described my invention, I claim as new and desire to secure by Letters Patent—

1. The combination of the screw having a ratchet with the frame carrying the drill-rod, the spring-actuated arm connected to the drill-rod and engaging with a cam-block secured to said drill-rod-carrying frame, and the lever acting upon said arm and having a pawl engaging with the ratchet of said screw, substantially as and for the purpose set forth.

2. The combination of the block supported upon the drill-frame and formed or provided with a cam-slot, the bar or rod carrying rollers bearing in said cam-slot, said rod being connected by a link to the drill-rod and acted upon by a spring, and the lever passed between the said rollers, substantially as and for the purpose set forth.

3. The block supported upon the drill-rod-carrying frame, and having a reversely-curved cam-slot, the bifurcated bar or rod carrying between its prongs or arms rollers bearing in said cam-slot, said bar or rod being jointed to the drill-rod and connected by a spring to said drill-rod-carrying frame, and the lever bearing against independent rollers of the said arm, substantially as and for the purpose set forth.

4. The combination of the screw having a nut and ratchet, and the cam-block having a reversely-curved slot with the spring-actuated arm jointed to the drill-carrying rod and having rollers bearing in said slot of cam, the lever disposed between said rollers and having a pawl engaging said ratchet, and the drill-tool having a ratchet engaged by a spring-pawl connected to the frame carrying the drill-rod, substantially as and for the purpose set forth.

ANDREW McCONNELL.

Wtinesses:
   W. C. BARR,
   JAMES W. SKEES.